Patented June 14, 1932

1,863,116

UNITED STATES PATENT OFFICE

GEORGE H. HEYMANN, OF LOUISVILLE, KENTUCKY

TOOTH PASTE

No Drawing.   Application filed April 29, 1929.   Serial No. 359,184.

This invention relates to tooth paste, and it has for its object a dentifrice containing an oxygen evolving constituent held in an inert state by the ingredient with which it is compounded, and adapted to liberate nascent oxygen when brought into contact with saliva in the operation of brushing the teeth, all as will be more fully described hereinafter and as claimed.

Attempts have heretofore been made to incorporate sodium perborate, which is recognized as the specific in the treatment of trench mouth, in dentifirices. Such attempts have proven unsuccessful, however, because sodium perborate is extremely unstable and quickly loses its oxygen value when subjected to moisture. It has been proposed to protect it from atmospheric moisture by compounding it with a soap, or with glycerine, but neither of these is capable of retaining it in situ in paste form, and as a result the sodium perborate rapidly decomposes and loses it efficacy.

It is, accordingly, an object of my invention to incorporate with sodium perborate an ingredient which will hold it in situ and render it stable until use, whereby it will retain its oxygen value although exposed to atmospheric moisture, but will rapidly evolve nascent oxygen when brought into contact with saliva in the operation of brushing the teeth.

To this end I admix sodium perborate with mineral oil products, preferably those of heavy consistency, and specifically, petrolatum. Other ingredients may be added for flavoring or for increasing the detergent quality of the paste. For example, I may use, in addition to the paste of sodium perborate and petrolatum, ingredients such as menthol, oil of wintergreen, powdered orris root and so forth. These, however, constitue no part of my invention and may be varied without departing therefrom.

Having described my invention what I claim is:

A tooth paste comprising an admixture of sodium perborate and petrolatum.

In testimony whereof I affix my signature.

GEORGE H. HEYMANN.